Dec. 11, 1951     H. C. JONES     2,578,250
WHEEL GRINDER

Filed June 14, 1949                           8 Sheets-Sheet 1

Inventor
Henry C. Jones.
By R. S. C. Dougherty
Attorney

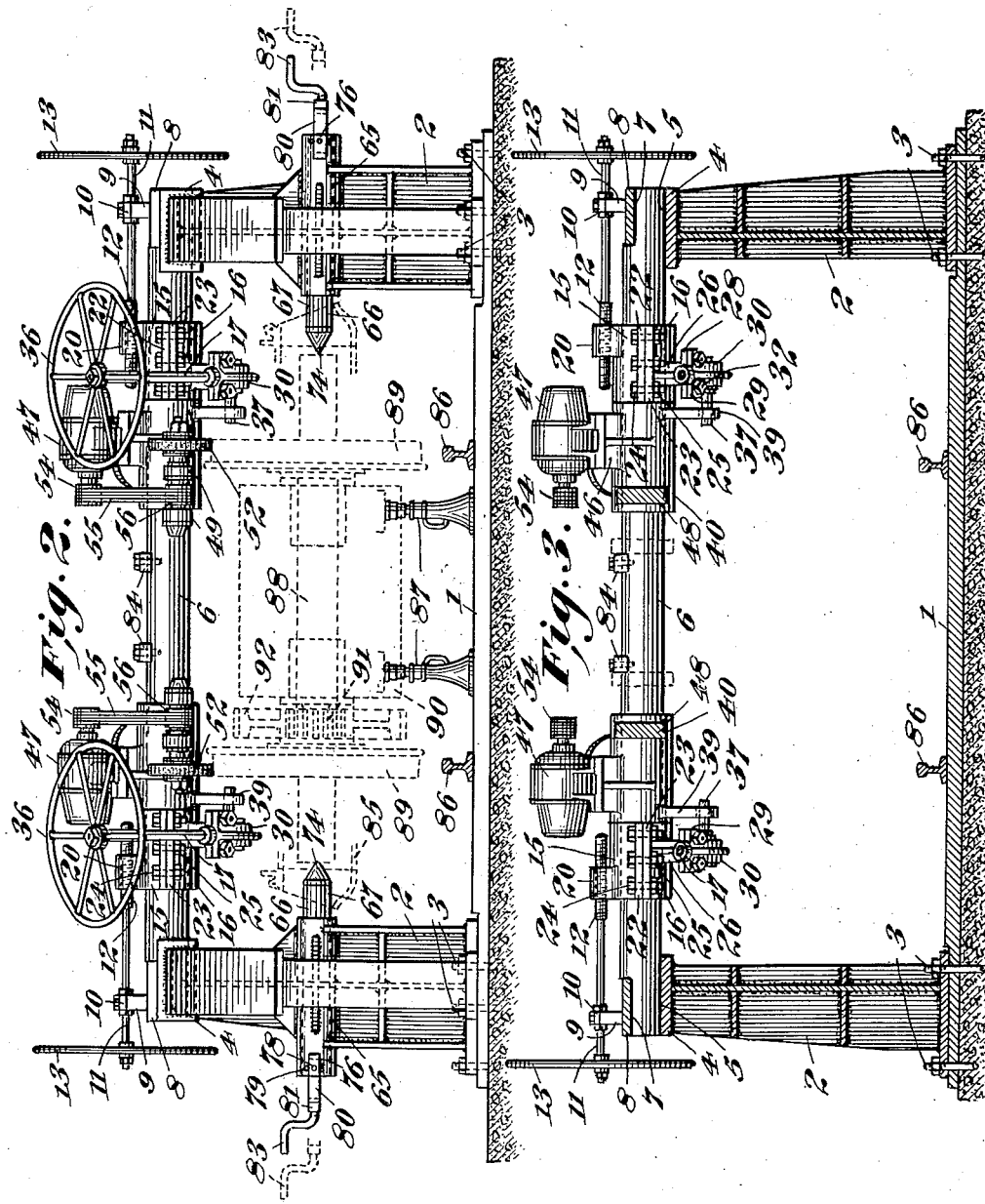

Dec. 11, 1951 — H. C. JONES — 2,578,250
WHEEL GRINDER
Filed June 14, 1949 — 8 Sheets-Sheet 3
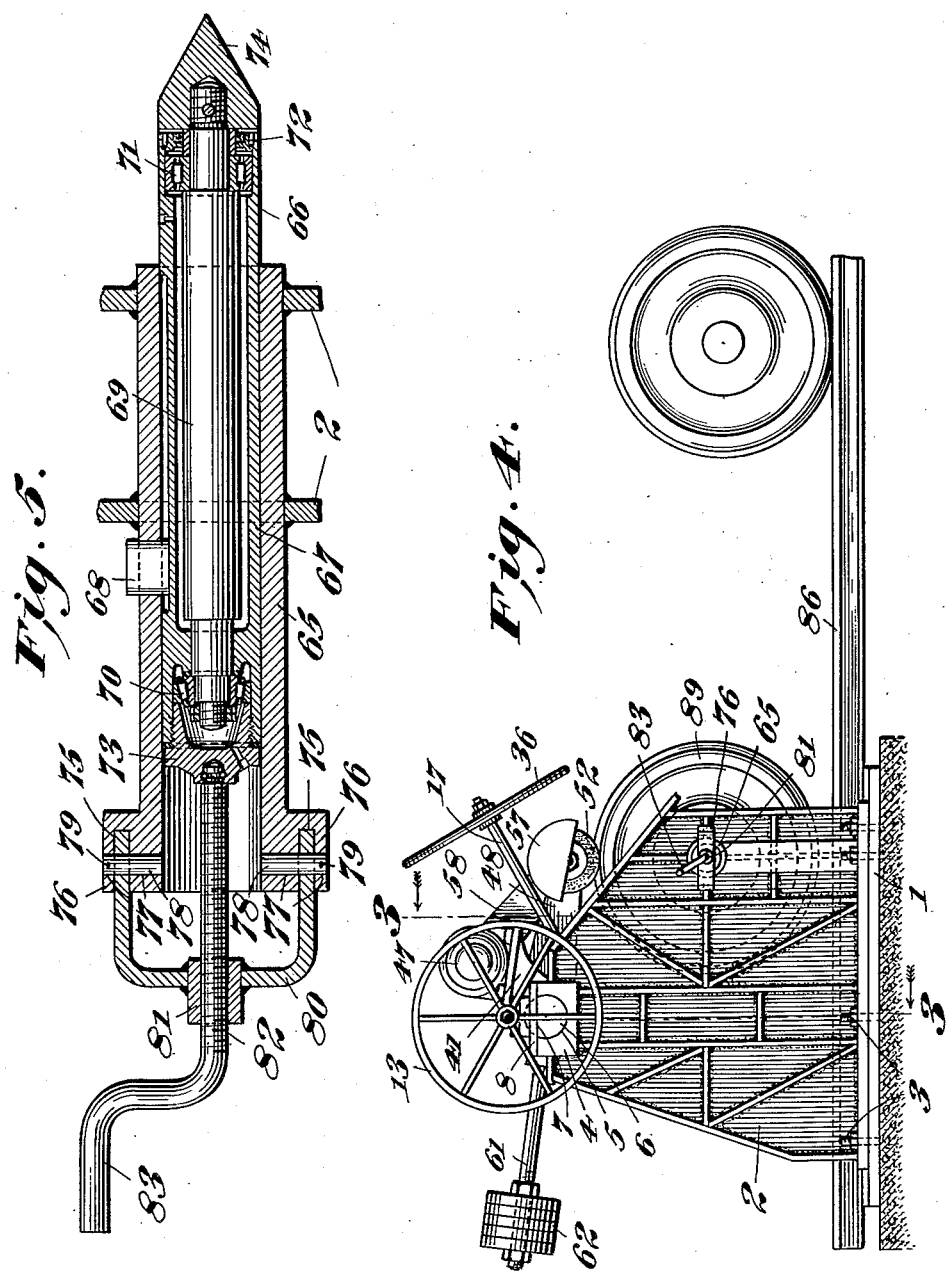
Inventor
Henry C. Jones.
By R. S. C. Dougherty
Attorney

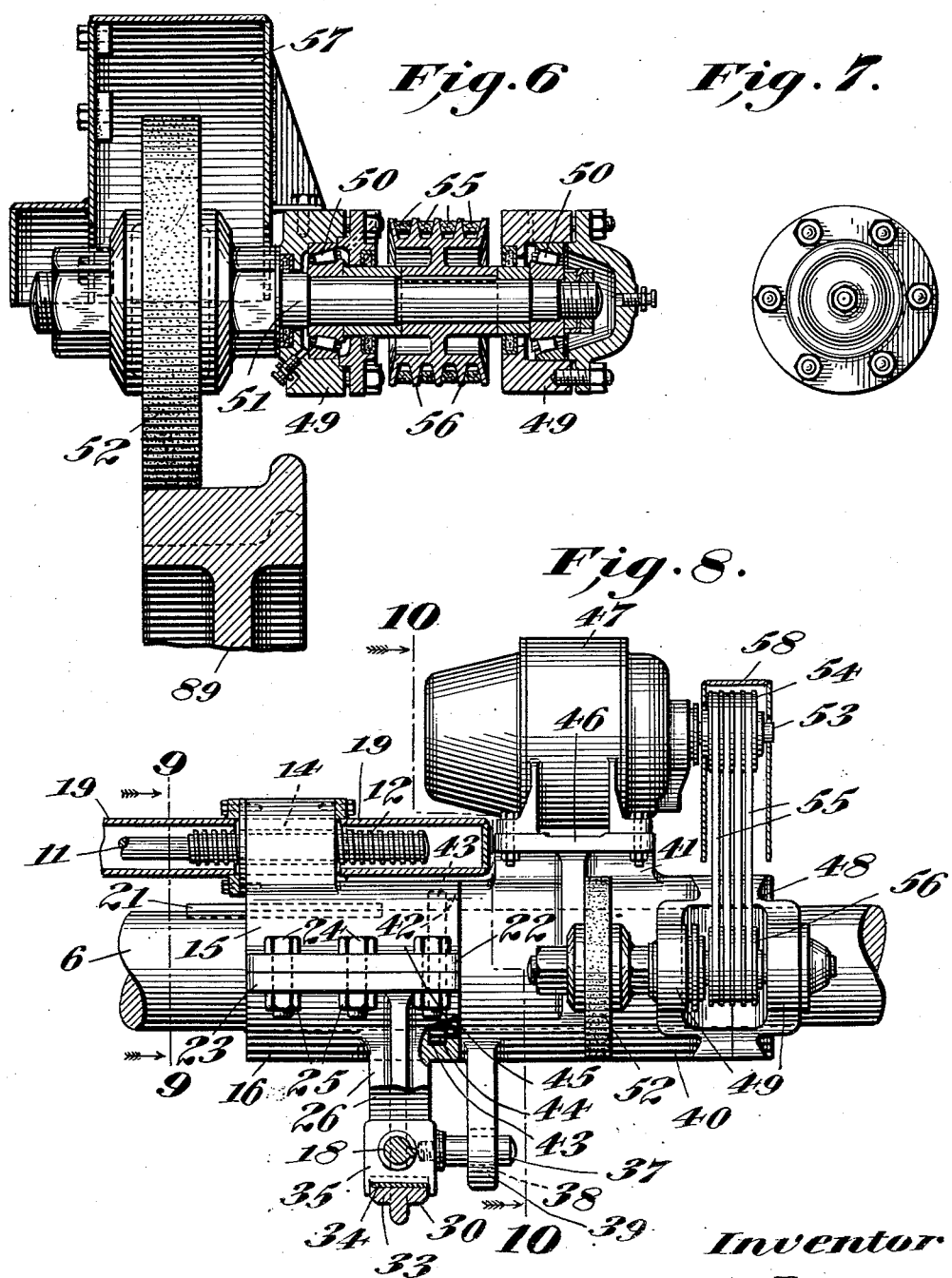

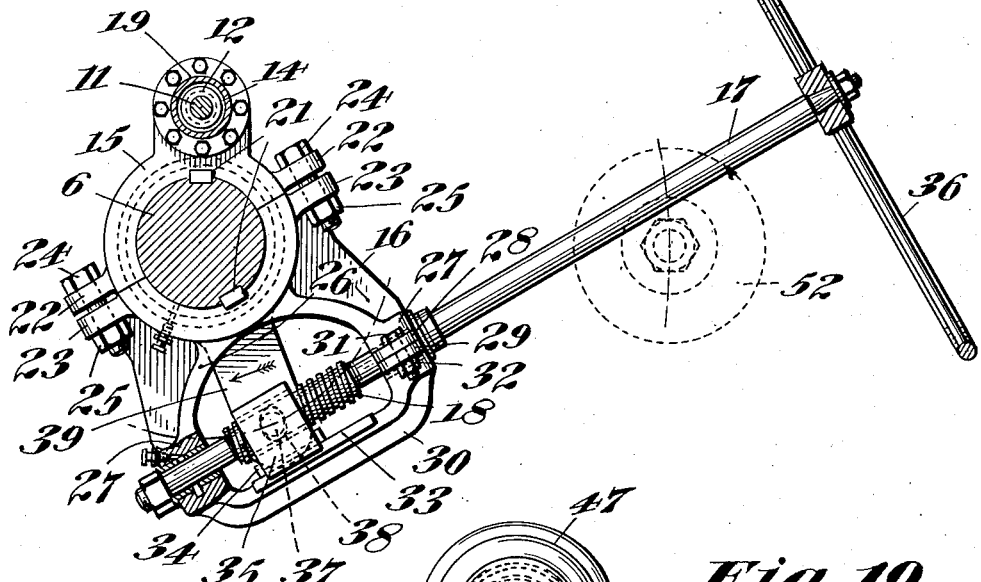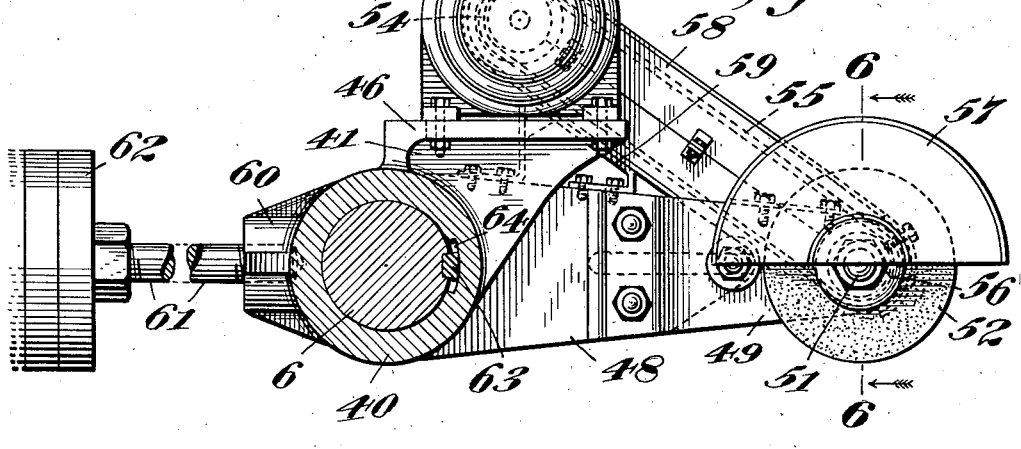

Dec. 11, 1951   H. C. JONES   2,578,250
WHEEL GRINDER
Filed June 14, 1949   8 Sheets-Sheet 6
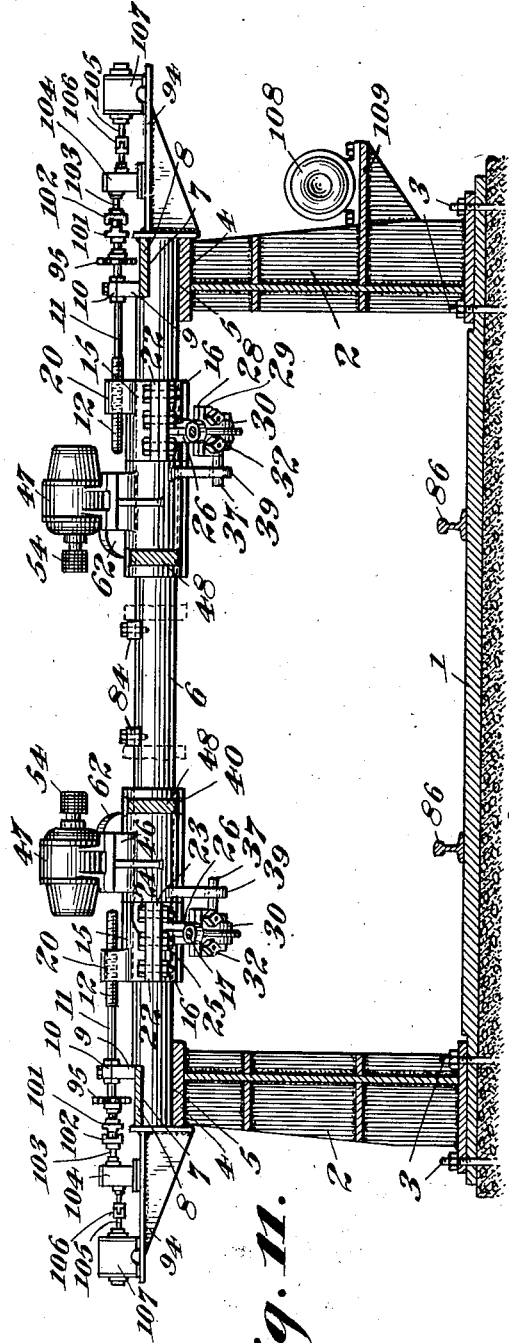
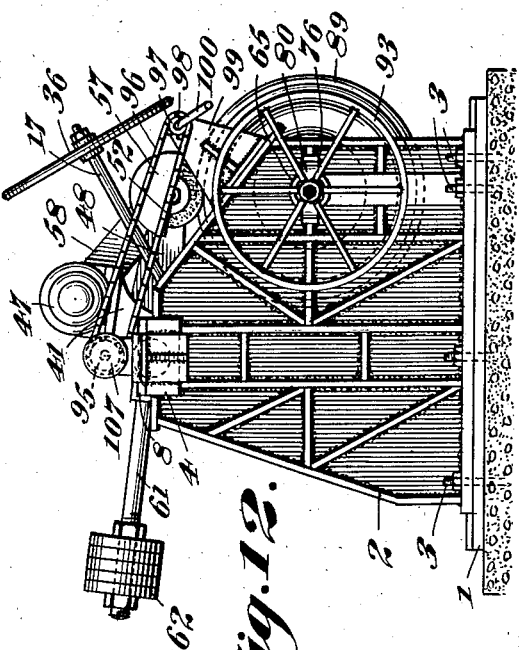
Inventor
Henry C. Jones.
By R. S. G. Dougherty.
Attorney

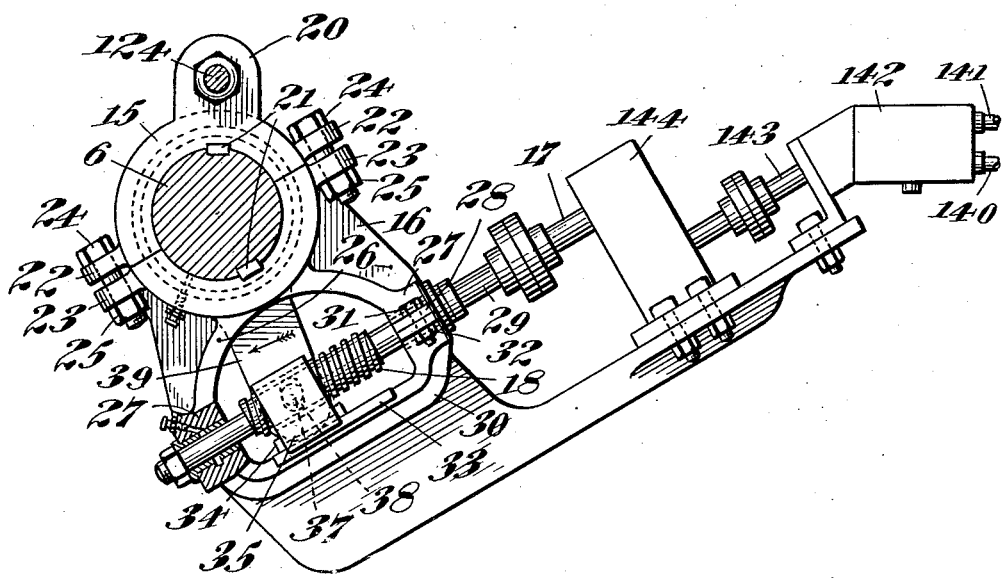
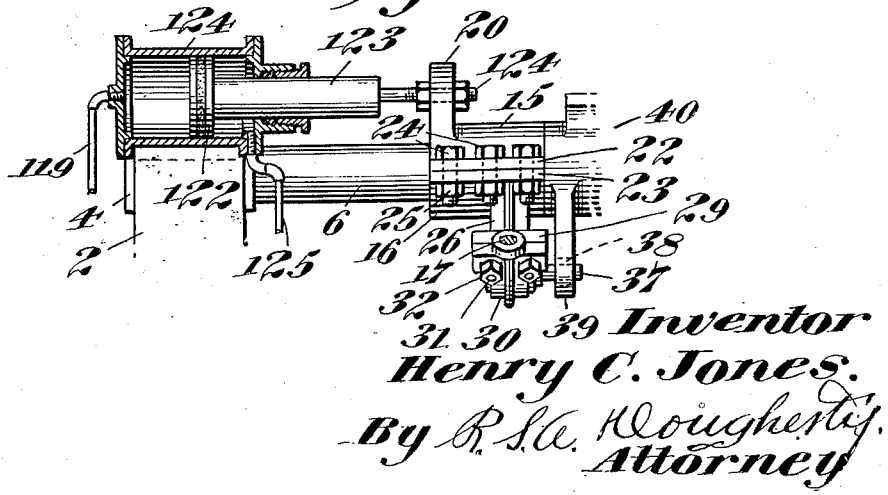

Dec. 11, 1951        H. C. JONES        2,578,250

WHEEL GRINDER

Filed June 14, 1949            8 Sheets-Sheet 8

Inventor
Henry C. Jones,
By R. S. C. Dougherty
Attorney

Patented Dec. 11, 1951

2,578,250

UNITED STATES PATENT OFFICE 2,578,250

WHEEL GRINDER

Henry C. Jones, Sparrows Point, Md., assignor to Patapsco and Back Rivers Railroad Company, a corporation of Maryland Application June 14, 1949, Serial No. 99,023

30 Claims. (Cl. 51—51)

This invention relates to improvements in wheel grinding machines adapted for use in grinding railway car wheels.

One of the objects of my invention is to provide for the truing of worn wheels of railway cars by regrinding without the necessity of removing the wheels and axles from the trucks and my invention is more particularly adapted for use in regrinding the wheels of diesel electric locomotive trucks.

Usually in resurfacing the treads and flanges of railway car wheels the truck is dismantled and the axles with the wheels thereon are removed from the truck, turned in a lathe and the truck reassembled.

The trucks used on diesel electric locomotives have a great amount of mechanism mounted thereon and to take the truck apart so as to remove the wheels and axles requires many man hours of work and the wheels after being turned require substantially the same amount of labor and time to reassemble.

In trucks of this type, the axles may be driven by separate motors.

A further object of the invention relates to the manner of supporting and rotating the pairs of axles and wheels during the grinding operation.

Another object of the invention relates to a machine in which a truck may be rolled into the machine and one end raised and supported by jacks and aligned at its axle center and rotated by means of its traction motor for grinding a pair of wheels.

Another object of the invention is provision of a grinding machine in which a truck may be rolled into the machine and one end raised and a pair of wheels aligned at the axle center and supported by jacks or the like under the motor axle support bearings and rotated by its traction motor or by other means during the grinding operation, then lowering the raised end of the truck and aligning another axle etc.

Another object of the invention relates to the manner of mounting a pair of grinding wheel assemblies on a stationary main shaft with means for adjusting the grinding wheels to and from the work.

Another object of my invention relates to utilizing a hydraulic mechanical system with the necessary controls to produce the desired longitudinal and vertical movements for adjusting each of the grinding wheels.

A further object of my invention relates to the manner of forming the tailstocks.

Still another object of my invention relates to the manner of feeding the grinding wheels into cutting engagement with the car wheels during the grinding operation and the manner of retracting automatically the grinding wheels out of cutting engagement with the car wheels after the grinding operation.

With these and other objects in view as will be apparent to one skilled in the art, this invention resides in the combination of parts set forth in the accompanying description and covered by the claims appended thereto.

Having thus given a general description of the objects of my invention, I will now in order to make the same more clear, refer to the annexed eight sheets of drawings forming a part of this specification and in which like characters of reference denote like parts.

Fig. 2 is a front elevation of the machine with a truck indicated in dotted lines.

Fig. 3 is a vertical longitudinal section taken substantially on the line 3—3 of Fig. 4.

Fig. 4 is an end elevation.

Fig. 5 is an enlarged longitudinal sectional view of the actuating means for one of the tailstocks.

Fig. 6 is an enlarged sectional view showing the driven shaft assembly for one of the grinding wheels taken on the line 6—6 of Fig. 10.

Fig. 7 is a detail view of the end cap for the driven shaft assembly shown in Fig. 6.

Fig. 8 is a front elevation of the sub-assembly of one of the grinding units with parts shown in section.

Fig. 9 is an enlarged detail section showing the hand wheel and screw for vertically adjusting one of the grinding wheels taken on the line 9—9 of Fig. 8.

Fig. 10 is a detail section of one of the grinding wheel assemblies taken on the line 10—10 of Fig. 8.

Fig. 11 is a vertical longitudinal section similar to Fig. 3, but showing a modification.

Fig. 12 is an end elevation of the machine shown in Fig. 11.

Fig. 13 is a detail modification showing a hand wheel for adjusting one of the tailstocks instead of a crank.

Fig. 14 is a modification showing the screw for vertically adjusting one of grinding wheels actuated by a hydraulic motor.

Fig. 15 is a modification showing fluid pressure actuating means for longitudinally adjusting one of the grinding wheel assemblies.

Figure 1:
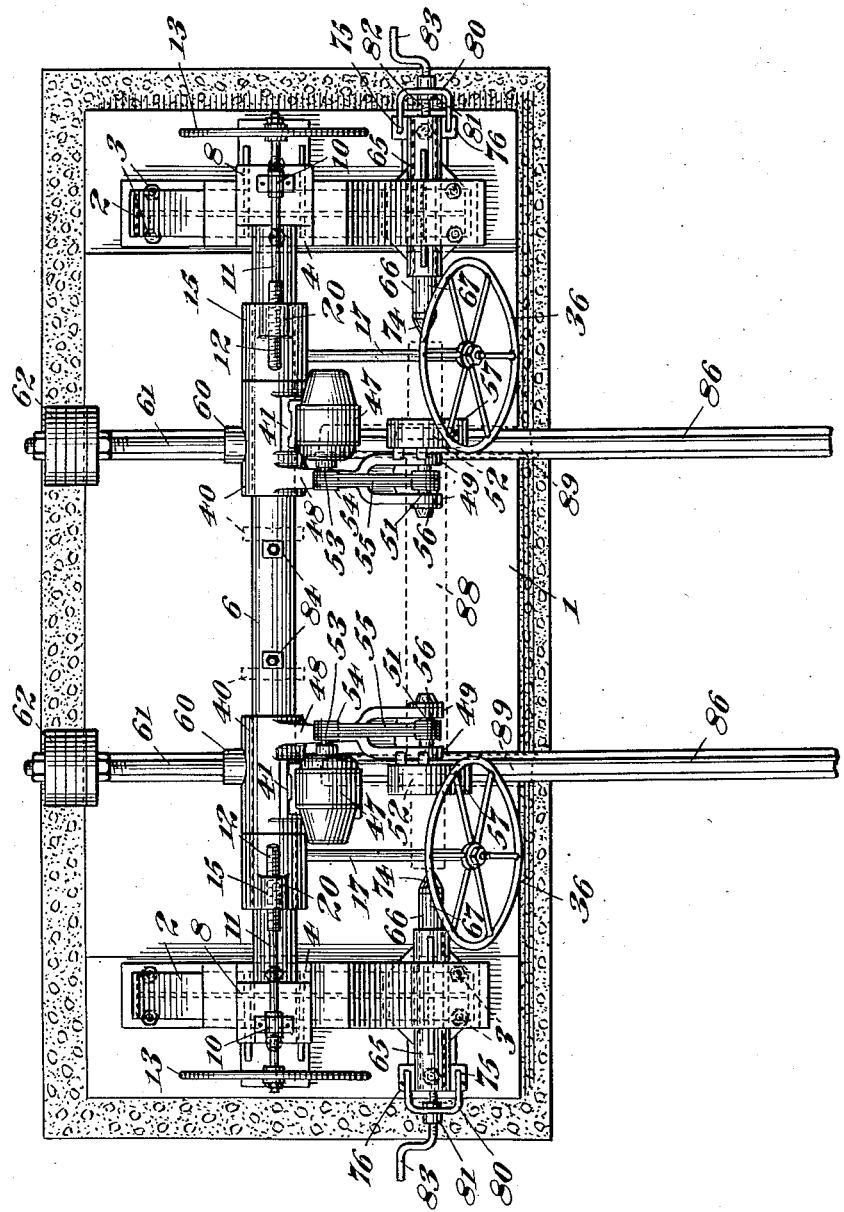
Figure 1 is a top plan view of the improved grinding machine, with an axle and a pair of wheels in position for grinding shown in dotted lines.

Referring now to the drawings in detail and first to Figs. 1 to 10, inclusive, the numeral 1 indicates the base plate of the machine upon which is mounted a pair of end frames 2 which are right and left but of similar construction, each formed of a plurality of plate members cut into the required shape and welded together and secured at their lower ends to the base plate 1 by means of bolts 3. A bearing block 4 is secured to the top of each end frame, each having a recess 5 formed therein for receiving the ends of a stationary main shaft 6 upon which the grinding wheel assemblies and the means for vertically adjusting the grinding wheels are carried.

The upper surfaces of the ends of the main shaft 6 above the recesses 5 are flattened as at 7 to receive cap plates 8 which are secured to the tops of the bearing blocks 4 and are each provided with an upwardly bearing 9 with a cap 10 for receiving the shank 11 of screws 12 which are manually operated by means of hand wheels 13 to longitudinally adjust the grinding wheels and the means for vertically adjusting the same.

As each of the grinding wheel assemblies and means for vertically adjusting the grinding wheels are the same a detailed description of one will apply to both.

The screw 12 is threaded into a nut 14 in the cap 15 of the bearing member 16 for the shaft 17 of the screw 18 for vertically adjusting the grinding wheels as more clearly shown in Figs. 8 and 9 and have a cover 19 for said screw 12 as indicated, or it may be threaded into an ear 20 extending from the top cap 15 as shown in Figs. 1, 2, 3 and 11.

The cap 15 and bearing member 16 are keyed as at 21 to the main shaft 6, each being flanged as at 22 and 23 and secured together by means of bolts 24 and nuts 25.

The bearing member 16 is provided with a pair of spaced leg extensions 26 which are formed with bearings 27 at their lower ends for receiving the shaft 17 at opposite ends of the screw 18. The bearings 27 are flanged as at 28 and are connected to the flanged ends 29 of a bottom cap member 30 by means of bolts 31 and nuts 32. This bottom cap member 30 is provided with a crosshead guide 33 for receiving a crosshead shoe 34 for a crosshead 35 in which is threaded the screw 18 on the shaft 17 that extends outwardly and upwardly at an inclined angle and provided with a hand wheel 36 at its outer end for manually rotating the screw. The crosshead 35 has a pin 37 extending outwardly therefrom into a slot 38 formed in an arm 39 extending from the tubular body portion 40 of the motor and grinding wheel support 41.

The cap 15 and the bearing member 16 are provided at one end with a flange 42 and recess 43 for receiving the annular flange 44 and recess 45 formed at one end of the tubular portion 46 of the motor and wheel support 41 whereby the members are coupled together.

The tubular body portion 40 of the motor and grinding wheel support has a bracket 46 extending upwardly therefrom for supporting a motor 47 and an arm 48 having a bifurcated end 49 provided with roller bearings 50 for supporting the spindle 51 for the grinding wheel 52. The shaft 53 of the motor 47 has a multiple V-groove pulley 54 which is connected by V-belts 55 with a multiple V-groove pulley 56 on the spindle 51 for the grinding wheel 52 which has a guard 57 supported on one of the bifurcated ends 49 of the arm 48. The V-belts 55 and V-groove pulleys 54 and 56 are also provided with a guard 58 which is supported on the arm 48 by means of a bracket 59. As indicated in Fig. 10, a boss 60 extends outwardly from one side of the tubular portion 40 of the motor and grinding wheel support in which is threaded one end of a rod 61 which has a weight 62 mounted on its opposite end. This tubular portion 40 is keyed as at 63 to the stationary main shaft 6 with the keyway 64 in the tubular portion having a greater width than the key to allow a certain amount of movement of the tubular portion in relation to the stationary main shaft 6, for the purpose which will be more fully described later.

Mounted in a tubular bearing portion 65 secured to each end frame 2 below the main shaft 6 and at one side thereof is a tailstock 66. The tailstock in one end frame is mounted in true axial alignment with the tailstock in the other end frame with their cone centers facing each other. These tailstocks each have an outer case 67 keyed as at 68 to the tubular bearing portion 65 for sliding movement in which is mounted a shaft 69 having its ends reduced and supported in roller bearings 70 and 71 and provided with a head cap 72 and a tail cap 73. A cone shaped center 74 is secured to the inner end of the shaft 69. In order to adjust the tailstock the outer end of the tubular bearing portion 65 at opposite sides is enlarged and slotted as at 75 and provided with lugs 76 and formed with holes 77 for receiving pins 78 held in position by cotter pins 79 for attaching the ends of a yoke 80 thereto. The central portion of the yoke 80 is provided with a nut 81 in which is threaded the shaft 82 of a crank arm 83 for operating the same.

The operation of the machine is as follows, assuming the machine is empty and the tailstocks retracted and the grinding assemblies retracted or in the position to engage the stops 84 with the grinding wheels raised by means of the weights 62 on rods 61 turning the tubular portion of the motor and grinding wheel supports 41 until the keys 63 engage the upper end of the keyways 64. A four wheel truck 85 of the Diesel electric locomotive type or the like with the covers for the journal boxes for the ends of the axles removed or opened is rolled into the machine on the rails 86 and one end raised by means of jacks 87 or the like until the centers in the ends of the axle 88 are in alignment with the cone shaped ends of the tailstocks. The tailstocks are then advanced until the cone shaped ends engage the centers of the ends of the axles, as indicated in dotted lines in Fig. 2. The raised end of the truck is now aligned by the cone centers of the tailstocks which engage the centers at the ends of the axles. The hand wheels 13 are now operated to bring the grinding wheels adjacent to the tread surface of the wheels 89. The hand wheels 36 are now rotated to move the grinding wheels 52 through the action of the screws 18, crossheads 35, pins 37 in slots 38 of the arms 39 into contact with the treads of the wheels as indicated in Figs. 1, 2, 4 and 6 of the drawings. During this operation the arms 39 will be moved in the direction of the arrow as indicated in Fig. 9.

In trucks of this type each axle may be driven by a motor 90, the shaft of which has a pinion 91, meshing with a gear 92 which is secured to the axle 88. The motor 90 is now started thereby rotating the axles 88 and car wheels 89. The motors 47 for rotating the grinding wheels are now started and by the manipulation of the hand wheels 13 the grinding wheels 52 may be shifted back and forth along the tread and flange surfaces of the car wheels, and by rotating the hand wheels 36 the grinding wheels may be fed slowly into cutting engagement with the car wheel treads and flanges. After completing the grinding operation for one pair of wheels the power to the motors 47 and 90 is cut off, the hand wheel 36 operated to move the arm 39 in the opposite direction to that indicated by the arrow in Fig. 9 and the weight 62 on rod 61 will then automatically rotate the tubular portion 40 until the keys 63 engage the upper ends of the keyways 64 thereby moving the grinding wheels 52 out of engagement with the tread surfaces of the car wheels 89. The tailstocks may then be retracted and the raised end of the truck lowered for the wheels to engage the track by means of the jacks. The truck is then rolled out of the machine on the track 86 and the end of the truck reversed and then rolled back into the machine on the track and the operation above described repeated. I may however roll the truck through the machine without reversing the ends of the truck, by first rolling the truck into the machine on the track to the proper position for grinding the forward pair of wheels, then the forward end of the truck is raised by the jacks and the pair of wheels ground. The raised end of the truck is then lowered to the track and the truck advanced to the proper position for grinding the rear pair of wheels. The rear end of the truck is then raised by means of the jacks and the wheels ground in a similar manner, then the end of the truck lowered and the truck rolled out of the machine, or I may elevate the entire truck from the rails and intermittently advance the truck through the machine for each grinding operation of the pairs of wheels in succession.

In Figs. 11 to 13, I have shown a modification of the machine shown in Figs. 1 to 10, inclusive, in which each of the screws 12 may be electrically or manually operated, and I have shown a hand wheel 93 instead of a crank arm 83 for actuating the tailstocks, otherwise the construction is the same and the same reference numerals will apply thereto.

At each end of the main shaft 6 and attached to the outer end faces of the bearing blocks 4 is a bracket 94 upon which the actuating means is supported, and as these are the same a detailed description of one will apply to both. The shank of the shaft 11 for the adjusting screw 12, is mounted on the bearing 9 and is provided with a sprocket wheel 95 connected by means of a sprocket chain 96 extending to a sprocket wheel 97 having a shaft 98 journaled in a bracket 99, said shaft 98 having a crank arm 100 at one end for rotating the same. The shank of the shaft 11 for the adjusting screw 12 is also provided with a clutch member 101 adapted to engage clutch member 102 on a shaft 103 extending into a housing 104 which has reduction gearing mounted therein. A shaft 105 extends outwardly from the opposite side of the reduction gearing housing provided with a universal joint 106 and driven by a motor 107. In a machine arranged in this manner all the motors may be arranged to be controlled by one operator. If it is desired to operate the screw 12 manually the clutch members 101 and 102 may be thrown out of engagement and the screw 12 rotated by the crank arm 100 and the sprockets and chain attachment.

In most shops a three phase (A. C.) alternating current at 220 or 440 volts, 60 cycle is usually furnished as a source of electrical power. All traction motors used on American diesel electric locomotives are series wound (D. C.) direct current machines making a rectifier or motor-generator set necessary. The latter type is the only one worthy of consideration in this case and for this purpose I have shown in Fig. 11 at 108 a small motor-generator set mounted on a bracket 109 which extends from one of the end frames 2, of the wheel grinding machine to provide a source of D. C. power to energize the truck traction motor which is geared to the wheel pair being ground, in case D. C. electrical power is not used in the shops where this grinding machine is being used.

In the specification I have described my invention as particularly adapted for use in regrinding the wheels for diesel electric locomotive trucks, but it could be used equally as well for regrinding the wheels for any truck or pair of wheels on an axle which are motor driven or rotated by other power means in case of a steam-railway car or other car not provided with a motor.

It is proposed and possible to construct the railway wheel grinding machine utilizing a hydraulic system and hydraulic controls to grind the necessary profiles of the treads and flanges that are standard upon said railway car wheels. It is also possible to use a combination of air and hydraulic, and air and mechanical elements or a combination of hydraulic, air, mechanical and electrical means. For practical purposes I have elected to develop a machine utilizing mechanical, hydraulic and electrical controls.

Figure 16:
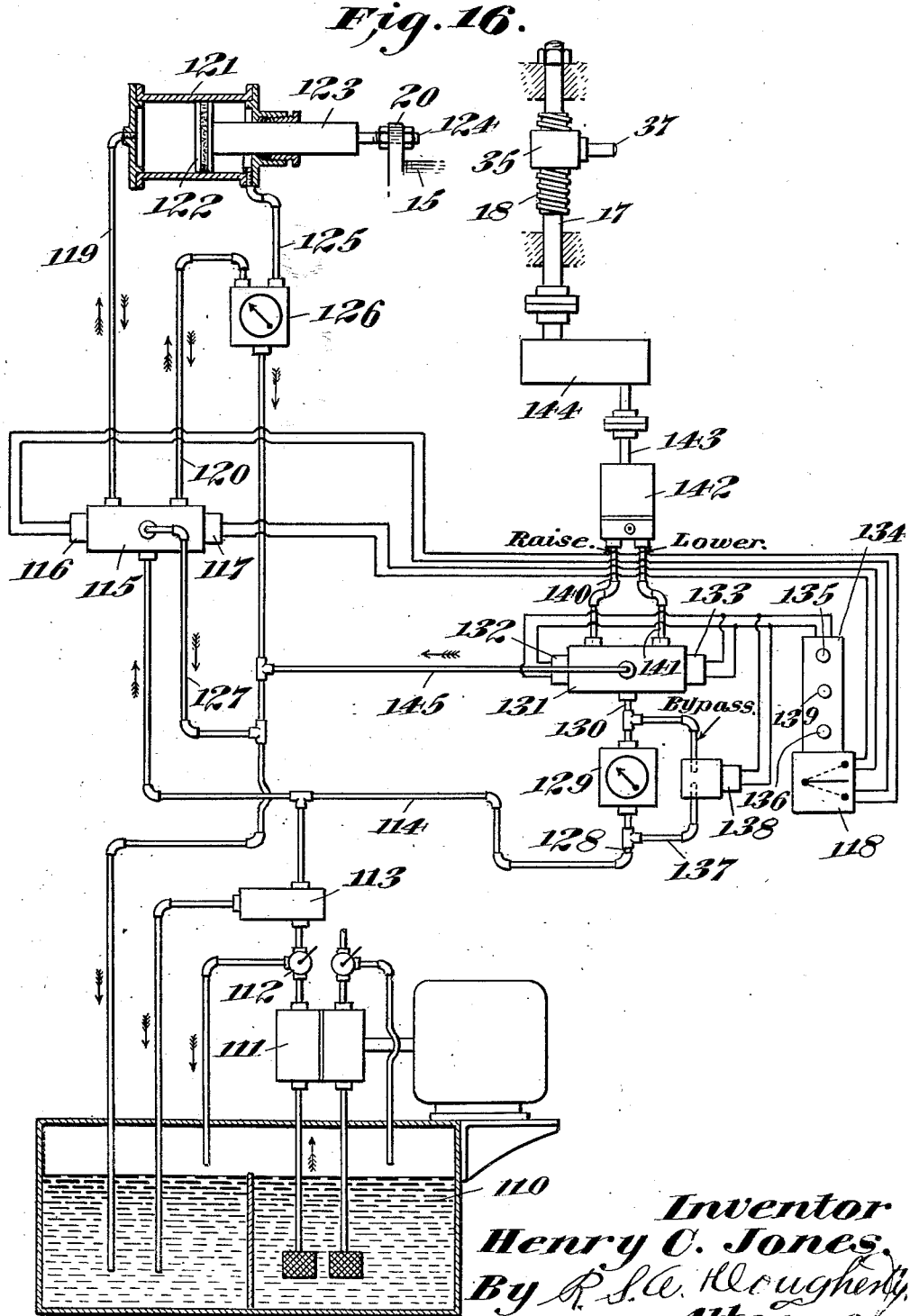
Fig. 16 is a modification showing a schematic diagram of a hydraulic mechanical system with controls to produce the necessary movements as applied to a wheel grinding machine.

Referring now to Figs. 14, 15 and 16. In Fig. 16 a have illustrated a schematic diagram of a hydraulic mechanical system with the necessary controls to produce the desired movements as applied to my wheel grinding machine.

This diagram discloses a fluid control provided with a reservoir 110 from which hydraulic fluid such as oil is removed by means of a motor driven pump 111. This pump is in duplicate since there are two complete systems per grinder, the diagram showing only one half of the necessary system for a complete grinder. The hydraulic pump 111 discharges the fluid into a 3-way valve 112 which is also adapted to drain the complete system in the event that only one half of the machine is operative. After passing through the 3-way valve 112 the fluid under pressure goes through a pressure relief regulating valve 113 which is set to a predetermined pressure as is commonly done in all hydraulic systems. This pressure for example might be 300 lbs., or up to 600 or 800 lbs. depending upon the amount of work and energy to be overcome in the hydraulic system.

The fluid after passing through this relief valve will enter pipe line 114 which drains the fluid under pressure to a 4-way hydraulic valve 115. This 4-way hydraulic valve 115 has electrical solenoid elements 116 and 117 which are controlled by means of a switch 118.

The fluid after passing through the 4-way valve 115 will enter the pipe line 119 or pipe line 120 which is of course determined by the position of the 4-way valve 115. The pipes 119 and 120 are connected to a hydraulic cylinder 121 having a piston 122 working therein and provided with a piston rod extending therefrom which has an enlarged portion 123 and a reduced outer end portion 124 attached to the ear 28 extending from the cap 15 for longitudinally adjusting the grinding wheel assembly. For the forward movement of the piston 122 in the hydraulic cylinder 121 the fluid would enter the pipe 119 and force the piston in the forward direction. On the opposite side of the piston in the hydraulic cylinder 121 the hydraulic fluid is drained through pipe 125, metering valve 126, pipe 120 then through 4-way valve 115, and finally the fluid is returned through pipe 127 to the reservoir 110. On the backward stroke of the piston 122 the hydraulic fluid is drained through the pipe 119, 4-way valve 115 and the fluid returning through pipe 127 to the reservoir 110.

For the return stroke of the piston in cylinder 121 the hydraulic fluid takes a reverse motion and a quick return of the piston is obtained due to the differential area 123 of the piston rod in the cylinder 121.

In the above described system for the forward and backward movements of the piston 122 it is also possible to put into the pipe line 119 a metering-in valve rather than a metering-out valve in pipe line 120, both of which are customarily used in the industry in the hydraulic systems.

The above description relates to the longitudinal adjustment of the grinding wheel assemblies.

The following is a brief description of how the vertical adjustment of the grinding wheel is accomplished. This is required as it is necessary to grind a profile on a railway car wheel and by combining a horizontal motion with a controlled vertical motion an infinite number of profiles will result. For practical purposes I have selected a combination of mechanical, hydraulic and electrical elements that will accomplish this purpose and referring to the diagram in Fig. 16 the vertical motion will be accomplished as follows. Fluid such as oil is delivered from the reservoir 110 to the pressure pump 111 through the 3-way valve 112 and then through the pressure regulating valve 113 into pipe line 128. As the fluid progresses through the pipe line 128 it can selectively take two paths, one through the metering valve 129 which controls the volume of fluid per unit time and into pipe line 130 which enters into a 4-way valve 131 shown as electrically controlled by solenoids 132 and 133 from a switch 134 having push buttons 135 and 136. Although I have shown the 4-way valves 115 and 131 electrically controlled they could be operated manually or by any other standard methods of controlling 4-way valves instead if desired.

The fluid under pressure may also bypass metering valve 129 and enter pipe line 137 and through solenoid valve 138 controlled by a push button 139 on switch 134 and thus enter pipe line 130 and be discharged into the aforementioned 4-way hydraulic valve 131. The purpose of this bypass around the metering valve 129 is to get a more rapid motion when desired by the operator. The full volume of the fluid available under pressure will bypass the metering valve 129 at the election of the operator.

The fluid under pressure after leaving the 4-way valve 131 may go to pipe lines 140 and 141 which are connected to a hydraulic motor 142. This hydraulic motor 142 which is reversible has an infinitely variable speed depending upon the volume and pressure of fluid furnished to it as an actuating or motivating force. Thus the motor can be operated at any torque or speed between zero to maximum speed and full torque as is electively selected by the operator of the machine.

The hydraulic motor 142 is connected by means of a shaft 143 to a gear reducer 144 which may have any reduction desired for purposes of illustration and for practical usage I have selected approximately 40 or 50 to 1 speed reduction for actuating the shaft 17 of the screw 18 for vertically adjusting the grinding wheel as more clearly shown in Fig. 14.

As stated above the hydraulic motor 142 is reversible, if fluid pressure from the 4-way valve 131 is admitted to the hydraulic motor 142 through pipe line 140 it will rotate the screw 18 and thereby raise the grinding wheel vertically from the work, the fluid pressure from the hydraulic motor 142 being discharged through pipe line 141 into the 4-way valve 131 and discharged therefrom through pipe line 145 and returned to the reservoir 110, but if the fluid pressure from the 4-way valve 131 is admitted to the hydraulic motor 142 through pipe line 141 it will rotate the screw 18 in the reverse direction thereby lowering the grinding wheel into the grinding position. The fluid from the hydraulic motor 142 will then be discharged through the pipe 140 to the 4-way valve 131 and into the pipe line 145 and returned to the reservoir 110.

By the judicious selection of hydraulic pressures and a judicious selection of volume of oil pumped to the various elements described above any speeds and rates of doing work will be at the control of the operator. In addition, the judicious selection of the speed at which the vertical motion is accomplished will give any profile required and necessary for the grinding of a railway car wheel regardless of its worn condition or the type of contour desired.

Although I have illustrated and described my invention as particularly adapted for use in regrinding the wheels for diesel electric locomotive trucks of a conventional 4-wheel two axle type, it could be easily adapted to the grinding of wheels for other types of trucks. Furthermore, a wheel grinder can be constructed in which the grinding wheel has horizontal and vertical straight line movements without departing from the spirit of my invention.

Although I have shown and described my invention in considerable detail, I do not wish it to be limited to the exact construction shown and described, but may use such substitutions, modifications or equivalents thereof, as are embraced within the scope of my invention, or as pointed out in the claims.

I claim:

1. A machine for grinding the treads and flanges of railway wheels mounted on an axle, comprising a base plate, spaced end frames mounted on the base plate, a heavy stationary main shaft having its ends non-rotatably supported by the end frames, means for supporting the axle and wheels mounted thereon for rotation, a pair of grinding wheel assemblies mounted for longitudinal sliding movement on the stationary main shaft above the axle and wheels each provided with a grinding wheel, means operated by fluid pressure for longitudinally adjusting the grinding wheel assemblies to align the grinding wheels with the treads and flanges of the railway wheels, and means for vertically adjusting the grinding wheels into or out of engagement with the treads and flanges of the railway wheels.

2. A machine for grinding the treads and flanges of railway wheels mounted on an axle, comprising a base plate, spaced end frames mounted thereon, a bearing block mounted on each of the end frames, a massive stationary main shaft having its ends fixedly supported in the bearing blocks, a tailstock mounted in each end frame having centers adapted to engage the axle centers for the pair of wheels and align the same, means for rotating the axle with the pair of wheels, a pair of grinding wheel assemblies mounted for longitudinal sliding movement on the main shaft above the axle and wheels each provided with a grinding wheel, means for longitudinally adjusting the grinding wheel assemblies to align the grinding wheels with the treads and flanges of the railway wheels, and means operated by fluid pressure for vertically adjusting the grinding wheels into or out of engagement with the treads and flanges of the railway wheels.

3. A machine for grinding the treads and flanges of railway wheels mounted on an axle in a truck, comprising a base plate, spaced end frames mounted thereon, a bearing block mounted on each of the end frames, a stationary main shaft of substantial thickness having its ends mounted and rigidly supported in a fixed position in the bearing blocks, a tailstock mounted in each end frame having centers adapted to engage the axle centers for the pair of wheels and to align the same, means for rotating the axle and the pair of wheels mounted thereon, a pair of grinding wheel assemblies mounted for longitudinal sliding movement on the stationary main shaft above the axle and wheels each provided with a grinding wheel, means for longitudinally adjusting each of the grinding wheel assemblies independently of each other to align the grinding wheels with the treads and flanges of the railway wheels, and means operated by fluid pressure independent of each other for vertically adjusting each of the grinding wheels into or out of engagement with the treads and flanges of the railway wheels.

4. A machine for grinding the treads and flanges of railway wheels upon an axle without removing the axles and wheels from the truck, comprising a base plate, spaced end frames mounted thereon, a bearing block mounted on each of the end frames, a stationary main shaft having its ends affixed to and supported in the bearing blocks, a pair of grinding wheel assemblies mounted for longitudinal sliding movement on the stationary main shaft each carrying a grinding wheel adapted to engage each railway wheel tread and flange, a stationary track mounted on the base plate along which the truck may be rolled into and out of the machine, means for alternately elevating each of the ends of the truck from the track, a tailstock mounted in each end frame having centers adapted to engage the axle centers for a pair of railway wheels when the end of the truck is elevated, a motor for rotating the axle and railway wheels thereon, an adjusting screw connected to each grinding wheel assembly manually actuated for adjusting each of the grinding wheels independently of each other into alignment with the treads and flanges of each railway wheel, and means independent of each other for vertically adjusting each grinding wheel into or out of engagement with the wheel treads and flanges of the railway wheels.

5. In a machine for grinding the treads and flanges of railway wheels without removing the axles and wheels from the truck, a fixed track along which the truck may be rolled into or out of the machine, means for raising one end of the truck with an axle and a pair of wheels thereon, a pair of spaced tailstocks having centers adapted to engage the axle centers when the end of the truck is raised and to align the same, a non-rotatable stationary main shaft mounted above the truck, a pair of grinding wheel assemblies mounted on the main shaft each having a grinding wheel for acting on the top treads and flanges of a railway wheel, means for longitudinally adjusting the grinding wheel assemblies on the main shaft, means for transversely feeding the grinding wheels into engagement with the treads and flanges of the railway wheels, means for rotating the axle and railway wheels, and means for automatically retracting the grinding wheels after the grinding operation.

6. A machine for grinding the treads and flanges of railway wheels assembled on their axles, comprising a base plate, a pair of end frames mounted thereon, bearing blocks on the end frames, a stationary main shaft having its ends immovably supported in the bearing blocks, a tailstock mounted in each end frame having centers adapted to engage the axle centers of the wheel and axle assembly for rotation, a stationary continuous track along which the assembly may be rolled into and out of the machine, means for elevating and lowering the axle and railway wheel assembly, means for rotating the axle and railway wheel assembly, a pair of grinding wheel assemblies mounted on the stationary main shaft above the axle and wheels, means for longitudinally adjusting the grinding wheel assemblies on the stationary main shaft, a motor mounted on each grinding wheel assembly for rotating each grinding wheel above the railway wheel treads and flanges, and means for laterally moving the grinding wheels into engagement with the railway wheel treads and flanges for grinding the same.

7. In a machine for grinding the treads and flanges of railway wheels without removing the axles and wheels from the truck, a base plate for the machine, a pair of spaced end frames mounted on the base plate, bearing blocks mounted on the end frames, a stationary main shaft having its ends supported and secured against rotation in the bearing blocks, a track immovably mounted on the base plate along which the truck may be rolled into and out of the machine, means for elevating each end of the truck, a tailstock in each end frame having centers adapted to engage the axle centers for a pair of wheels when the end of the truck is raised, means for rotating the axle and railway wheels by its traction motor, a pair of grinding wheel assemblies mounted on the stationary main shaft each having a grinding wheel adapted to engage each railway wheel tread and flange, an adjusting screw connected to each grinding wheel assembly, a hand wheel for rotating each adjusting screw for longitudinally adjusting the grinding wheel assembly on the stationary main shaft, and an adjusting screw journaled for rotation on each grinding wheel assembly, and a hand wheel for rotating each of said adjusting screws for laterally moving the grinding wheels into engagement with the railway wheel treads and flanges for grinding the same.

8. A machine for grinding the treads and flanges of railway wheels without removing the axles and wheels from the truck, a base plate for the machine, a pair of spaced end frames mounted on the base plate, bearing blocks mounted on each of the end frames, a stationary main shaft having its ends clamped in the bearing blocks, a standard track rigidly fastened on the base plate along which the truck may be rolled into and out of the machine, means for elevating the truck from the track, a tailstock mounted in each end frame having centers adapted to engage the axle centers for a pair of wheels when the truck is elevated, means for rotating the axle and railway wheels by its traction motor, a pair of grinding wheel assemblies mounted on the stationary main shaft each having a grinding wheel adapted to engage each railway wheel tread and flange, an adjusting screw connected to each grinding wheel assembly, a hand wheel for rotating each adjusting screw for longitudinally adjusting the grinding wheel assembly on the stationary main shaft, an adjusting screw each having a hand wheel for laterally moving the grinding wheels into engagement with the railway wheel treads and flanges for grinding the same, and screw adjusting and automatic means for retracting the grinding wheels from the railway wheel treads and flanges after the grinding operation.

9. A machine for grinding the treads and flanges of railway wheels mounted upon an axle or without removing the axles and wheels from the truck, comprising a base plate, spaced end frames mounted thereon, a bearing block mounted on each end frame, a stationary main shaft mounted above the truck having its ends permanently fixed and supported in the bearing blocks, a pair of grinding wheel assemblies mounted for longitudinal sliding movement on the stationary main shaft each carrying a grinding wheel for engaging the top surface of the railway wheel treads and flanges, a tailstock mounted in each end frame having centers adapted to engage the axle centers for a pair of wheels, means for rotating the axle and railway wheels, an adjusting screw connected to each grinding wheel assembly for independently adjusting the grinding wheels into alignment with the tread and flange of each railway wheel, means for feeding the grinding wheels downwardly into engagement with the railway wheel treads and flanges for grinding the same, and means for automatically retracting the grinding wheels from the railway wheel treads and flanges after the grinding operation.

10. A machine for grinding the treads and flanges of railway wheels mounted on an axle without removing the axles and wheels from the truck, comprising a base plate, spaced end frames mounted thereon, a bearing block mounted on each of the end frames, a thick stationary main shaft having its ends supported and held rigidly against rotation in the bearing blocks, a pair of grinding wheel assemblies mounted for longitudinal sliding movement on the stationary main shaft each carrying a grinding wheel adapted to engage each railway wheel tread and flange, a track mounted in a fixed position on the base plate along which the truck may be rolled into and out of the machine, means for elevating each end of the truck from the track, a tailstock mounted in each end frame having centers adapted to engage the axle centers for a pair of wheels when the end of the truck is elevated, a motor for rotating the axle and railway wheels, an adjusting screw connected to each grinding wheel assembly for adjusting the grinding wheels into alignment with the tread and flange of each railway wheel, and means for vertically adjusting the grinding wheels into engagement with the wheel treads and flanges for grinding the same.

11. A machine for grinding the treads and flanges of railway wheels mounted upon an axle without removing the axles and wheels from the truck, comprising a base plate, spaced upright end frames mounted thereon, a stationary main shaft connecting the tops of the end frames and having its ends non-rotatably supported thereby, a stationary track mounted on the base plate along which the truck may be rolled into and out of the machine, means for elevating the ends of the truck from the track, a tailstock mounted in each end frame having centers adapted to engage the axle centers for a pair of wheels and align the same when the ends of the truck are elevated, a pair of grinding wheel assemblies mounted for longitudinal sliding and vertical movement on the stationary main shaft each carrying a grinding wheel adapted to engage the railway wheel tread and flange, an adjusting screw connected to each grinding wheel assembly for longitudinally adjusting the grinding wheels into transverse alignment with the tread and flange of each wheel and for shifting the grinding wheels back and forth across the treads and flanges of the railway wheels, a motor for rotating the axle and railway wheels, and an adjusting screw movable with each of the grinding wheel assemblies for feeding each of the grinding wheels into engagement with each wheel tread and flange for grinding the same and for retracting the grinding wheels after the grinding operation.

12. A machine for grinding the treads and flanges of railway wheels mounted upon an axle without removing the axles and wheels from the truck, comprising a base plate, a pair of spaced end frames mounted on the base plate, a bearing block mounted on each end frame, a stationary main shaft connecting the end frames and having its ends supported in the bearing blocks, a track mounted on the base plate along which the truck may be rolled into or out of the machine, means for elevating the ends of the truck from the track, a tailstock mounted in each end frame having centers adapted to engage the axle centers for a pair of railway wheels and to align the same when the ends of the truck are elevated, a pair of counterbalanced grinding wheel assemblies mounted for longitudinal sliding movement on the stationary main shaft each carrying a grinding wheel adapted to engage the railway wheel tread and flange, a motor supported on each grinding wheel assembly for rotating the grinding wheels, an adjusting screw connected to each grinding wheel assembly for longitudinally adjusting the grinding wheels into transverse alignment with the tread and flange of each wheel, a motor for rotating the axle and railway wheels, and an adjusting screw mounted for longitudinal movement with each grinding wheel assembly for feeding each of the grinding wheels into engagement with each wheel tread and flange for grinding the same, and means for automatically retracting each grinding wheel after the grinding operation.

13. A machine for grinding the treads and flanges of railway wheels mounted upon an axle without removing the axles and wheels from the trucks, comprising a base plate, a pair of spaced end frames mounted on the base plate, a bearing block mounted at the top of each end frame, a stationary main shaft connecting and having its ends supported and firmly clamped in the bearing blocks, a track mounted on the base plate along which the truck may be rolled into and out of the machine below the stationary main shaft, jacks for tiltingly elevating the ends of the truck, a tailstock mounted in each end frame carrying centers adapted to engage the axle centers at their ends to align the axle and wheels for rotation when each end of the truck is elevated, a motor for rotating the axle and wheels mounted thereon, a pair of counterbalanced grinding wheel assemblies each carrying a grinding wheel mounted on the stationary main shaft and actuated independently of each other, a motor mounted on each grinding wheel assembly for rotating each grinding wheel, an adjusting screw for longitudinally adjusting each of the grinding wheels into transverse alignment with the tread and flange of each wheel, an adjusting screw for independently feeding each of the grinding wheels into or out of engagement with the railway wheels, and means for automatically retracting the grinding wheels after the grinding operation.

14. A machine for grinding the treads and flanges of railway wheels mounted upon an axle without removing the axles and wheels from the truck, comprising a base plate, a pair of spaced end frames mounted on the base plate, a bearing block mounted at the top of each end frame, a stationary main shaft having its ends supported in the bearing blocks for connecting the upper ends of the end frames together, a track mounted on the base plate along which the truck may be rolled into and out of the machine below the stationary main shaft, jacks for elevating and lowering each end of the truck, a tailstock mounted for adjustment in each end frame carrying centers adapted to engage the axle centers at their ends to align the axle and wheels for rotation when each end of the truck is elevated, a motor for rotating the axle and wheels mounted on the truck, a pair of bearing members each having a cap mounted on the stationary main shaft and keyed thereto, a grinding wheel assembly having a tubular body portion mounted on the stationary main shaft and coupled to each bearing and cap therefor, a grinding wheel mounted on each grinding wheel assembly, a shaft having a threaded connection with the cap of each bearing member for longitudinally adjusting the grinding wheels to align them with the treads and flanges of the railway wheels, an adjusting screw journaled for rotation in each bearing member for feeding the grinding wheels into or out of engagement with the treads and flanges of the railway wheels, and means for rotating the tubular body portions of the grinding wheel assemblies on the stationary main shaft.

15. A machine for grinding the treads and flanges of railway wheels mounted on an axle without removing the axles and wheels from the truck, comprising a base plate, a pair of spaced end frames mounted on the base plate, a bearing block mounted at the top of each end frame, a stationary main shaft having its ends supported in the bearing blocks for connecting the end frames together, a track mounted on the base plate along which the truck may be rolled into and out of the machine, means for elevating each of the ends of the trucks, a tubular bearing mounted in each end frame, a tailstock mounted for adjustment in each tubular bearing having a cone center adapted to engage the axle centers at their ends to align the axle and wheels for rotation, an adjusting screw having a crank for adjusting each of the tailstocks, a motor for rotating the axle and wheels mounted on the truck, a pair of bearing members each having a cap mounted on the stationary main shaft and keyed thereto for sliding movement, a grinding wheel assembly having a tubular body portion mounted on the stationary main shaft and coupled to each bearing member and cap therefor, a grinding wheel mounted on each grinding wheel assembly, a shaft having a threaded connection with the cap of each bearing member for longitudinally adjusting the grinding wheels to align them with the treads and flanges of the railway wheels, an adjusting screw journaled for rotation in each bearing member for rotating the tubular body portion of each grinding wheel assembly for vertically adjusting the grinding wheels into or out of engagement with the treads and flanges of the railway wheels.

16. A machine for grinding the treads and flanges of railway wheels mounted on an axle without removing the axles and wheels from the truck, comprising a base plate, spaced end frames mounted on the base plate, a bearing block mounted on each end frame, a stationary main shaft having its ends supported in the bearing blocks, a track mounted on the base plate along which the truck may be rolled into and out of the machine, means for elevating each end of the truck, a tailstock mounted for adjustment in each end frame having centers adapted to engage the axle centers at their ends to align the axle and wheels for rotation, a pair of bearing members each having a cap mounted for sliding movement on the stationary main shaft and keyed thereto to prevent rotation, a pair of grinding wheel assemblies each having a tubular body portion mounted for sliding and rotary movement on the stationary main shaft each coupled to one of the bearing members and cap therefor, a grinding wheel carried by each grinding wheel assembly, a motor mounted on each grinding wheel assembly for rotating each grinding wheel, a shaft having a threaded connection with the cap for each bearing member for longitudinally adjusting the grinding wheels to align them with the treads and flanges of the railway wheels, an adjusting screw journaled for rotation in each bearing member for rotating the tubular body portion of each grinding wheel assembly for vertically adjusting the grinding wheels into or out of engagement with the treads and flanges of the railway wheels, and a weight mounted on a shaft attached to the tubular body portion of each of the grinding wheel assemblies for normally swinging the grinding wheel out of engagement with the railway wheel treads and flanges.

17. A machine for grinding the treads and flanges of railway wheels mounted on an axle without removing the axles and wheels from the truck, comprising a base plate, spaced end frames mounted on the base plate, a bearing block mounted on each end frame, a stationary main shaft having its ends supported in the bearing blocks, a track along which the truck may be rolled into and out of the machine, means for elevating the ends of the truck, a tailstock mounted for adjustment in each end frame having centers adapted to engage the axle centers at the ends to align the axle and wheels for rotation, a pair of bearing members each having a cap mounted for sliding movement on the stationary main shaft and keyed thereto to prevent rotation, a pair of grinding wheel assemblies independently actuated each having a tubular body portion mounted for longitudinal sliding and rotary movement on the stationary main shaft each coupled to one of the bearing members and cap therefor, a grinding wheel carried by each grinding wheel assembly, a motor mounted on each grinding wheel assembly for rotating each grinding wheel, a shaft having a threaded connection with the cap for each bearing member for longitudinally adjusting each grinding wheel to align them with the treads and flanges of the railway wheels, a pair of spaced legs extending from the bearing member having a bearing at each lower end, a cap member connecting the bearings at the lower ends of the legs, said cap having a crosshead guide formed thereon, a crosshead mounted for sliding movement on the crosshead guide, a threaded opening in the crosshead, a shaft journaled in the bearings at the lower ends of the spaced legs having a screw thread engaging the said threaded opening in the crosshead, an arm extending from the tubular body portion of the grinding wheel assembly, a slot formed in the arm, a pin secured to the crosshead and extending into the slot in the arm, and means for rotating the shaft and screw thread to reciprocate the crosshead to actuate the arm and tubular body portion of the grinding wheel assembly to vertically adjust the grinding wheel into or out of engagement with the railway wheel.

18. A machine for grinding the treads and flanges of railway wheels mounted on an axle without removing the axle and wheels from the truck, comprising a pair of end frames, a bearing block mounted on each end frame, a stationary main shaft having its ends supported in the bearing blocks, a track along which the truck may be rolled into and out of the machine, means for elevating the truck, a tailstock mounted in each end frame, centers carried by said tailstocks adapted for adjustment to engage the centers at the ends of the axles to align the axle and wheels for rotation, a bearing member mounted for longitudinal sliding movement on the stationary main shaft and keyed thereto to prevent rotation, a grinding wheel assembly having a tubular body portion mounted for longitudinal and rotary movement on the stationary main shaft and coupled to the bearing member, a grinding wheel carried by the grinding wheel assembly, a motor mounted on the grinding wheel assembly for rotating the grinding wheel, a shaft having a threaded connection with each bearing member for longitudinally adjusting the grinding wheel to align it with the tread and flange of the railway wheel, a crosshead guide formed on each bearing member, a crosshead mounted for reciprocating movement on the crosshead guide, a threaded opening in the crosshead, a shaft journaled on the bearing member having screw threads engaging said threaded opening in the crosshead, an arm extending from the tubular body portion of the grinding wheel assembly, a slot in the arm, a pin secured to the crosshead and extending into the slot in the arm, and means for rotating the shaft and screw thread to reciprocate the crosshead on the crosshead guide to actuate the arm and tubular body portion of the grinding wheel assembly to vertically adjust the grinding wheel into or out of engagement with the railway wheel.

19. A machine for grinding the treads and flanges of railway wheels mounted on an axle without removing the axles and wheels from the truck, comprising a pair of end frames, a bearing block mounted on each end frame, a stationary main shaft having its ends supported in the bearing blocks, a track along which the truck may be rolled into or out of the machine, means for elevating the truck, a tailstock mounted in each end frame, centers carried by said tailstocks adapted for adjustment to engage the centers at the ends of the axle to align the axle and wheels for rotation, a pair of bearing members mounted for longitudinal sliding movement on the stationary main shaft and keyed thereto to prevent rotation, a pair of grinding wheel assemblies independently actuated each having a tubular body portion mounted for longitudinal and rotary movement on the stationary main shaft each coupled to one of the bearing members, a grinding wheel carried by each grinding wheel assembly, a motor mounted on each grinding wheel assembly for rotating each grinding wheel, a shaft having a threaded connection with each bearing member for longitudinally adjusting each grinding wheel to align them with the threads and flanges of the railway wheels, a crosshead guide formed on each bearing member, a crosshead mounted for reciprocating movement on each crosshead guide, a threaded opening in the crosshead, a shaft journaled in each bearing member having screw threads engaging the said threaded openings in each crosshead, an arm extending from the tubular body portion of each of the grinding wheel assemblies, a slot in each arm, a pin secured to each crosshead and extending into the slot in each arm, and means for rotating each shaft and screw threads to reciprocate the crossheads to actuate each arm and tubular body portion of each grinding wheel assembly to vertically adjust the grinding wheels into or out of engagement with the railway wheels.

20. A machine for grinding the treads and flanges of railway wheels while mounted on their axles without removing the axles and wheels from the truck, comprising a pair of end frames, a bearing block mounted on each end frame, a stationary main shaft having its ends mounted in the bearing blocks, a stationary continuous track along which the axle and wheels may roll into and out of the machine, means for elevating and supporting the axle and wheels, a tailstock mounted in each end frame, centers carried by said tailstock adapted for adjustment to engage the centers at the ends of the axle to align the axle and wheels for rotation, driving means on the truck adapted for rotating the axle with the wheels mounted thereon, a pair of grinding wheel assemblies independently actuated mounted on the stationary main shaft, an arm adjustably counterweighted and supported on said stationary main shaft for counterbalancing the weight of each grinding wheel assembly, a grinding wheel mounted on each grinding wheel assembly, means for rotating each grinding wheel, means for longitudinally adjusting each grinding wheel assembly to align the grinding wheels with the tread and flange of each railway wheel, and means for vertically adjusting the grinding wheels into or out or engagement with the railway wheel treads and flanges.

21. A machine for grinding the treads and flanges of a pair of railway wheels without removing the axles and wheels from the truck, comprising a base plate, spaced end frames mounted on the base plate, a bearing block mounted on each of the end frames, a stationary main shaft having its ends supported and secured against rotation in the bearing blocks, means for elevating and supporting the ends of the truck, a tailstock mounted in each end frame having adjustable centers adapted to engage the axle centers at the ends for the pair of wheels and to align the same for rotation, means for rotating the axle and the pair of wheels, a pair of grinding wheel assemblies mounted for reciprocating movement on the stationary main shaft each provided with a grinding wheel and a counterbalance arm therefor, means mounted on each grinding wheel assembly for rotating each grinding wheel, electrically operated means coupled to screw-threaded mechanisms for longitudinally adjusting the grinding wheels assemblies to align each of the grinding wheels with the treads and flanges of the railway wheels, and means for vertically adjusting the grinding wheels into or out of engagement with the treads of the railway wheels.

22. A machine for grinding the treads and flanges of railway wheels without removing the axles and wheels from the truck, comprising a base plate, spaced end frames mounted on the base plate, a bearing block mounted on each of the end frames, a stationary main shaft having its ends supported in the bearing blocks, means for elevating and supporting the ends of the truck, a tailstock mounted in each end frame having adjustable centers adapted to engage the axle centers at the ends for a pair of wheels and to align the same for rotation, means for rotating the axle and the pair of wheels, a pair of independently actuated grinding wheel assemblies mounted for reciprocating movement on the stationary main shaft each provided with a grinding wheel, a motor mounted on each grinding wheel assembly for rotating the grinding wheel, a motor having a drive shaft connection for longitudinally adjusting each grinding wheel assembly to align the grinding wheels with the treads and flanges of the railway wheels, a clutch in said drive shaft connection, means for manually adjusting the grinding wheels when the clutch is thrown out of engagement, and an adjustable screw for vertically adjusting each grinding wheel into or out of engagement with the tread and flange of each railway wheel.

23. A machine for grinding the treads and flanges of railway wheels mounted on an axle without removing the axles and wheels from the truck, comprising a base plate, spaced end frames mounted on the base plate, a bearing block mounted on each end frame, a stationary main shaft having its ends supported in the bearing blocks, a track along which the truck may be rolled into and out of the machine, means for elevating and supporting the ends of the truck, a tailstock mounted in each end frame having centers adapted to engage the axle centers at their ends to align the axle and wheels for rotation, means for rotating the axle and wheels mounted thereon, a bearing mounted for reciprocation on the stationary shaft and keyed thereto to prevent rotation, a grinding wheel assembly having a tubular body portion mounted for reciprocation and rotary movement on the stationary main shaft and coupled to the bearing, a grinding wheel carried by the grinding wheel assembly, a motor mounted on the grinding wheel assembly for rotating the grinding wheel, a shaft having a threaded connection with the bearing for longitudinally adjusting the grinding wheel to align it with the tread and flange of a railway wheel, a pair of spaced legs extending from the bearing having a bearing at each lower end, a cap member connecting the bearings at the lower ends of the legs, said cap having a crosshead guide formed thereon, a crosshead mounted for reciprocating movement on the crosshead guide, a threaded opening in the crosshead, a shaft journaled in the bearings at the lower ends of the spaced legs having a screw thread for engaging the said threaded opening in the crosshead, an arm extending from the tubular body portion of the grinding wheel assembly, a slot formed in the arm, a pin secured to the crosshead and extending into the slot in the arm, and means for rotating the shaft and screw thread to reciprocate the crosshead to actuate the arm and tubular body portion of the grinding wheel assembly to vertically adjust the grinding wheel into or out of engagement with the railway wheel.

24. A machine for grinding the treads and flanges of railway wheels mounted on an axle without removing the axles and wheels from the truck, comprising a base plate, a pair of spaced end frames mounted on the base plate, a bearing block mounted on each end frame, a stationary main shaft having its ends supported in the bearing blocks, a track along which the truck may be rolled into and out of the machine, means for elevating and supporting the ends of the truck, a tailstock mounted in each end frame having centers adapted to engage the axle centers at their ends to align the axle and wheels for rotation, means for rotating the axle and wheels mounted thereon, a pair of bearings mounted for reciprocation on the stationary main shaft and keyed thereto to prevent rotation, a pair of grinding wheel assemblies each having a tubular body portion mounted for reciprocation and rotary movement on the stationary main shaft each coupled to one of the bearings, a grinding wheel carried by each grinding wheel assembly, a motor mounted on each grinding wheel assembly for rotating the grinding wheels independently of each other, a shaft having a threaded connection with each bearing for longitudinally adjusting the grinding wheels to align them with the treads and flanges of the railway wheels, an arm extending from each tubular body portion of the grinding wheel assemblies, a slot in each arm, a crosshead guide mounted on each bearing, a crosshead mounted for reciprocating movement on each of the crosshead guides, a threaded opening in each crosshead, a shaft journaled on each bearing having a screw thread engaging the said threaded openings in the crosshead, a pin secured to each crosshead and extending into the slot in each arm, and means for rotating the shafts and the screw threads to reciprocate the crossheads to actuate the arms and tubular body portions of the grinding wheel assemblies to vertically adjust the grinding wheels into or out of engagement with the railway wheels.

25. A machine for grinding the treads and flanges of railway wheels mounted on an axle, comprising a base plate, spaced end frames mounted on the base plate, a stationary main shaft having its ends supported by the end frames, means for supporting the axle and wheels mounted thereon for rotation, a pair of grinding wheel assemblies mounted for longitudinal sliding movement on the stationary main shaft each provided with a grinding wheel, fluid pressure means for longitudinally adjusting the grinding wheel assemblies to align the grinding wheels with the treads and flanges of the railway wheels, and means actuated by fluid pressure for vertically adjusting the grinding wheels into or out of engagement with the treads and flanges of the railway wheels.

26. A machine for grinding the treads and flanges of railway wheels mounted on an axle, comprising a pair of spaced end frames, a main shaft having its ends supported by the end frames, means for supporting the axle and wheels for rotation, a grinding wheel assembly mounted for longitudinal sliding movement on the main shaft provided with a grinding wheel, a cylinder mounted on one of the end frames, a piston in the cylinder, a piston rod secured to said piston having its outer end connected to the grinding wheel assembly, means for admitting fluid under pressure to the cylinder on opposite sides of the piston for longitudinally adjusting the grinding wheel assembly to align the grinding wheel with the tread and flange of a railway wheel, and means for controlling the supply of fluid pressure to the cylinder.

27. A machine for grinding the treads and flanges of railway wheels mounted on an axle, comprising a pair of spaced end frames, a main shaft having its ends supported by the end frames, means for supporting the axle and wheels for rotation, a pair of grinding wheel assemblies mounted for longitudinal sliding movement on the main shaft each provided with a grinding wheel, a cylinder mounted on each end frame, a piston in each cylinder, a piston rod secured to each piston each having their outer end connected to one of the grinding wheel assemblies, means for admitting fluid under pressure to each cylinder on opposite sides of each piston for longitudinally adjusting each grinding wheel assembly to align the grinding wheels with the treads and flanges of each railway wheel, and means for controlling the supply of fluid pressure to the cylinders.

28. A machine for grinding the treads and flanges of railway wheels mounted on an axle, comprising a pair of spaced end frames, a main shaft having its ends supported by the end frames, means for supporting the axle and wheels for rotation, a grinding wheel assembly mounted for longitudinal sliding movement on the main shaft provided with a grinding wheel, fluid pressure means for longitudinally adjusting the grinding wheel assembly to align the grinding wheel with the treads and flanges of the railway wheels, an adjusting screw actuated by a hydraulic motor for vertically adjusting the grinding wheel into or out of engagement with the tread and flanges of the railway wheels, and means for controlling the supply of fluid pressure to the hydraulic motor.

29. A machine for grinding the treads and flanges of railway wheels mounted on an axle, comprising a pair of spaced end frames, a main shaft having its ends supported by the end frames, means for supporting the axle and wheels for rotation, a pair of grinding wheel assemblies mounted for longitudinal sliding movement on the main shaft each provided with a grinding wheel, a cylinder mounted on each end frame, a piston in each cylinder, a piston rod secured to each piston each having its outer end connected to one of the grinding wheel assemblies, means for admitting fluid under pressure to each cylinder on opposite sides of each piston for the forward and backward stroke of each piston adapted for longitudinally adjusting each grinding wheel assembly to align the grinding wheels with the treads and flanges of each railway wheel, means for controlling the supply of fluid pressure to the cylinders, means for effecting a quick backward stroke of each piston, an adjusting screw mounted on each grinding wheel assembly each actuated by a hydraulic motor for vertically adjusting the grinding wheels into or out of engagement with the treads and flanges of the railway wheels, and means for controlling the supply of fluid pressure to the hydraulic motors.

30. A machine for grinding the treads and flanges of railway wheels mounted on an axle without removing the axles and wheels from the truck, comprising a base plate, spaced end frames mounted thereon, a bearing block mounted on each end frame, a stationary main shaft having its ends supported in the bearing blocks, a pair of grinding wheel assemblies mounted for longitudinal sliding movement on the stationary main shaft each carrying a grinding wheel adapted to engage each railway wheel tread and flange, a track mounted on the base plate along which the truck may be rolled into and out of the machine, means for elevating the ends of the truck from the track, a tailstock mounted in each end frame having centers adapted to engage the axle centers for a pair of wheels when the truck is elevated, a motor for rotating the axle and railway wheels, fluid pressure means connected to each grinding wheel assembly for adjusting the grinding wheels into alignment with the tread and flange of each railway wheel, an adjusting screw mounted on each grinding wheel assembly each actuated by a hydraulic motor for vertically adjusting the grinding wheels into or out of engagement with the treads and flanges of the railway wheels, and means for controlling the supply of fluid pressure to the hydraulic motors.

HENRY C. JONES.

REFERENCES CITED

The following references are of record in the file of this patent:

UNITED STATES PATENTS

| Number | Name | Date |
| --- | --- | --- |
| 259,728 | Smith | June 20, 1882 |
| 573,694 | Pedrick | Dec. 22, 1896 |
| 1,171,812 | Vial | Feb. 15, 1916 |
| 1,627,074 | Blair et al. | May 3, 1927 |
| 2,164,491 | Bitler | July 4, 1939 |
| 2,180,529 | Kaseberg | Nov. 21, 1939 |